United States Patent
Kam et al.

(10) Patent No.: US 11,075,410 B2
(45) Date of Patent: Jul. 27, 2021

(54) BATTERY MODULE SYSTEM

(71) Applicant: Samsung SDI Co., Ltd., Yongin-si (KR)

(72) Inventors: Jaewoo Kam, Yongin-si (KR); Gilchoun Yeom, Yongin-si (KR); Sanggu Lee, Yongin-si (KR); Youngjin Lee, Yongin-si (KR); Hyeoncheol Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 114 days.

(21) Appl. No.: 16/574,739

(22) Filed: Sep. 18, 2019

(65) Prior Publication Data

US 2020/0144679 A1   May 7, 2020

(30) Foreign Application Priority Data

Nov. 6, 2018   (KR) .................... 10-2018-0135339

(51) Int. Cl.
*H01M 10/42* (2006.01)

(52) U.S. Cl.
CPC .......... *H01M 10/4207* (2013.01); *H01M 2010/4271* (2013.01)

(58) Field of Classification Search
CPC ......... H01M 10/4207; H01M 10/4257; H01M 2010/4271; Y02E 60/10; Y02T 10/70; Y02T 70/44; H02J 7/0021; H02J 2007/0098; H02J 50/80
USPC ........................................................ 320/116
See application file for complete search history.

(56) References Cited

U.S. PATENT DOCUMENTS

| | | | |
|---|---|---|---|
| 10,243,923 B2 | 3/2019 | Jo | |
| 2014/0327403 A1* | 11/2014 | Yokoura | H02J 7/0021 320/128 |
| 2015/0084598 A1 | 3/2015 | Song | |
| 2019/0361075 A1* | 11/2019 | Lee | H01M 10/4207 |

FOREIGN PATENT DOCUMENTS

| | | |
|---|---|---|
| KR | 10-0321901 B1 | 1/2002 |
| KR | 2003-0064455 A | 8/2003 |
| KR | 10-2015-0033188 A | 4/2015 |
| KR | 10-2016-0041260 A | 4/2016 |
| KR | 10-2017-0051071 A | 5/2017 |
| KR | 10-2017-0122367 A | 11/2017 |

* cited by examiner

*Primary Examiner* — Paul Dinh
(74) *Attorney, Agent, or Firm* — Lewis Roca Rothgerber Christie LLP

(57) ABSTRACT

A battery module system includes a master module and at least one slave module that are connected in series. An isolated communication is performed between the master module and the at least one slave module.

10 Claims, 2 Drawing Sheets

BATTERY MODULE SYSTEM

CROSS-REFERENCE TO RELATED APPLICATION

This application claims priority to and the benefit of Korean Patent Application No. 10-2018-0135339, filed on Nov. 6, 2018, in the Korean Intellectual Property Office (KIPO), the content of which is incorporated herein in its entirety by reference.

BACKGROUND

1. Field

One or more embodiments relate to a battery module system, and more particularly, to a battery module system in which a master module and at least one slave module are connected in series and an isolated communication is performed between the master module and the at least one slave module.

2. Description of the Related Art

A high-capacity battery system may be mounted on an energy storage device or an electricity-powered vehicle such as an electric vehicle. The high capacity battery system may include a high-capacity battery pack to increase the charge capacity thereof.

In general, the high-capacity battery pack may include a plurality of cells, each cell may be monitored by slave modules that manage the cell, and the entire high-capacity battery pack may be managed by a master module that manages the slave modules that manage each cell.

The master module may allocate an identification number for managing a plurality of slave modules and exchange data based on the allocated identification number. Because the data communication is performed between modules and each module has a different reference potential, it may be desirable to improve the reliability in the communication between modules.

In the related art, an analog front end (AFE) and an expensive processor are separately designed and used to improve the communication reliability. However, the use of the expensive processor and the AFE may increase the manufacturing cost thereof and they may not be replaced with other processors and AFEs, which may hinder the development flexibility of the entire battery module system.

SUMMARY

In order to address the above concern, aspects of one or more embodiments are directed to a battery module system including various isolation units in each module to perform inter-module communication with higher reliability.

Also, because an isolation unit is provided in a slave module itself, a general-purpose processor and an analog front end (AFE) may be used to manufacture the slave module.

Additional aspects will be set forth in part in the description which follows and, in part, will be apparent from the description, or may be learned by practice of the presented embodiments.

According to one or more embodiments, a battery module system includes: a plurality of slave modules comprising a first slave module and a second slave module adjacent to the first slave module and a master module connected in series with the plurality of slave modules.

The master module may include: a first processor configured to generate a first wake-up signal for waking up the plurality of slave modules and to allocate and manage an identification number of the plurality of slave modules; and a master terminal connecting the master module to the first slave module connected to the master module.

The first slave module may include: an analog front end (AFE) configured to be woken up by receiving the first wake-up signal, to measure at least one physical quantity of the first slave module, and to transmit the measured at least one physical quantity to a second processor; the second processor configured to receive and process a signal transmitted by the first processor, to transmit a signal to the first processor, and to process a physical quantity measured by the AFE; a first slave terminal connecting the master module to the at least one slave module; a second slave terminal connecting the second slave module to the first slave module; a first communication isolator arranged on a first communication line connecting the first slave terminal to the AFE, the first communication isolator being configured to transmit the first wake-up signal generated by the first processor to the AFE; and a second communication isolator arranged on a second communication line connecting the first slave terminal to the second processor, the second communication isolator being configured to transmit a signal generated by the first processor to the second processor or to transmit a signal generated by at least one selected from the second slave module and the second processor to the first processor, wherein an isolated communication is performed between the master module and the first slave module.

The first communication isolator may include at least one capacitor arranged on the first communication line. In this case, the first communication line may transmit a pulse width modulation (PWM) signal generated by the first processor and received through the first slave terminal to the AFE.

The second communication line may include: a (2-1)th communication line configured to transmit the signal generated by the first processor to the second processor; and a (2-2)th communication line configured to transmit the signal generated by at least one selected from the second slave module and the second processor to the first processor. In this case, the second communication isolator may include a high-frequency transformer arranged on the (2-1)th communication line and the (2-2)th communication line.

The master terminal and the first slave terminal may be electrically connected by a shielded cable including at least one shielding layer.

After receiving the first wake-up signal, the second processor may generate a second wake-up signal for waking up the second slave module and may transmit the generated second wake-up signal to the second slave module through the second slave terminal.

The first slave module and the second slave module may be electrically connected by a shielded cable including at least one shielding layer.

The master module may further include a slave module number setter configured to set the number of the plurality of slave modules. In this case, the slave module number setter may include a switch for setting the number of the plurality of slave modules connected to the master module by at least one bit.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
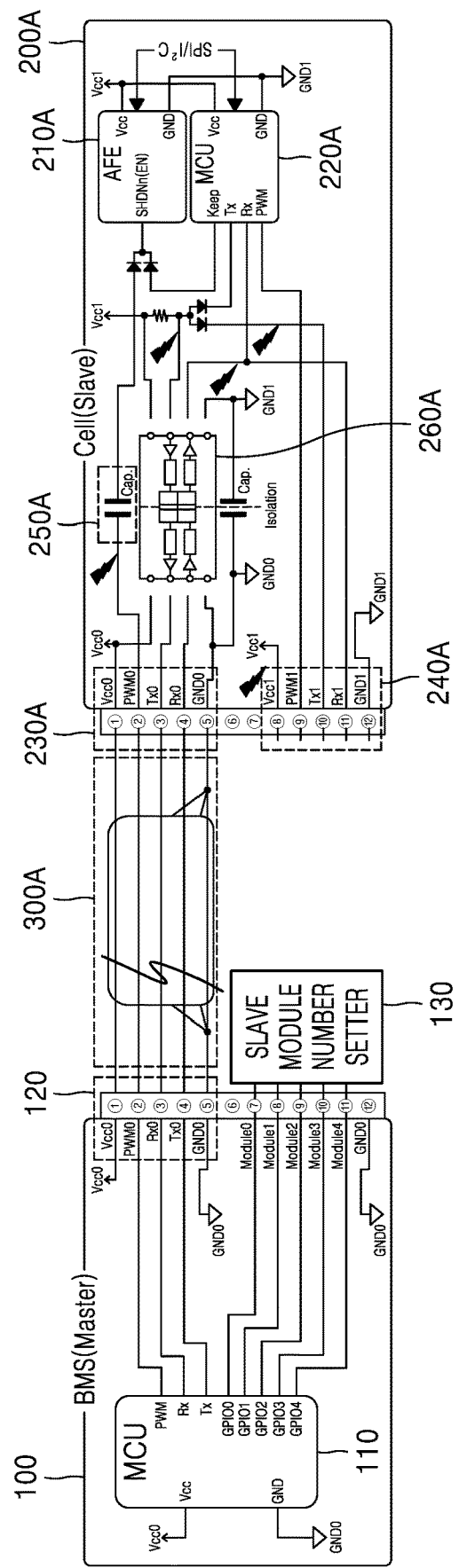
FIG. 1 is a diagram illustrating a master module and a first slave module from among a plurality of modules included in a battery module system according to an embodiment of the present disclosure.

References will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

The accompanying drawings for illustrating embodiments of the present disclosure are referred to in order to gain a sufficient understanding of the present disclosure, the merits thereof, and the aspects accomplished by the implementation of the present disclosure. However, it should be understood that the present disclosure is not limited to the embodiments described below but may be embodied in various suitable forms and may include all modifications, equivalents, and alternatives falling within the spirit and scope of the present disclosure. The embodiments described below are provided so that the present disclosure will be thorough and complete and will fully convey the scope of the present disclosure to those of ordinary skill in the art. In the following description of the present disclosure, certain detailed descriptions of the related art may be omitted when it is deemed that they may unnecessarily obscure the subject matters of the present disclosure.

For example, particular shapes, structures, and features described herein may be modified from some embodiments to other embodiments without departing from the spirit and scope of the present disclosure. Also, it will be understood that the position or arrangement of individual components in each embodiment may be modified without departing from the spirit and scope of the present disclosure. Thus, the following detailed description should be considered in a descriptive sense only and not for purposes of limitation, and the scope of the present disclosure should be construed as including the appended claims and all equivalents thereof. In the drawings, like reference numerals will denote like elements throughout various aspects. That is, particular details described herein are merely examples. Particular embodiments may vary from these example details and may still be contemplated within the spirit and scope of the present disclosure.

Although terms such as "first" and "second" may be used herein to describe various elements or components, these elements or components should not be limited by these terms. These terms are only used to distinguish one element or component from another element or component. Thus, a first element or component discussed below could be termed a second element or component, without departing from the spirit and scope of the inventive concept. Further, the use of "may" when describing embodiments of the inventive concept refers to "one or more embodiments of the inventive concept."

It will be understood that when an element or layer is referred to as being "on", "connected to", or "adjacent to" another element or layer, it can be directly on, connected to, or adjacent to the other element or layer, or one or more intervening elements or layers may be present. When an element or layer is referred to as being "directly on," "directly connected to", or "immediately adjacent to" another element or layer, there are no intervening elements or layers present.

As used herein, the terms "use," "using," and "used" may be considered synonymous with the terms "utilize," "utilizing," and "utilized," respectively.

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, embodiments of the present disclosure will be described in more detail with reference to the accompanying drawings. In the following description, like reference numerals will be used to denote like elements, and redundant descriptions thereof may be omitted for conciseness.

FIG. 1 is a diagram illustrating only a master module 100 and a first slave module 200A from among a plurality of modules included in a battery module system according to an embodiment of the present disclosure.

A battery module system according to an embodiment of the present disclosure may include a master module 100 and at least one slave module including a first slave module 200A. For example, the battery module system may include one master module and 32 slave modules. In this case, the master module 100 and the at least one slave module may be connected in series, and an isolated communication may be performed between the modules.

The master module 100 according to an embodiment of the present disclosure may be a module for managing at least one slave module. For example, the master module 100 may allocate and manage an identification number of at least one slave module. Also, based on the allocated identification number, the master module 100 may receive data (e.g., state of charge (SOC), current, and voltage of each battery cell) from at least one slave module and perform an operation on the data or transmit the data to an external device.

The master module 100 according to an embodiment of the present disclosure may include a first processor 110, a master terminal 120, and a slave module number setter 130.

The first processor 110 according to an embodiment of the present disclosure may include a unit for generating a first wake-up signal for waking up at least one slave module and for allocating and managing an identification number of at least one slave module. In this case, the first processor 110 may include any suitable type of device capable of processing data. For example, the first processor 110 may include a data processing device that is embedded in hardware and has a physically structured circuit to perform a function represented by the command or code in a program.

As an example, the data processing device embedded in hardware may include any processing device such as a microprocessor, a central processing unit (CPU), a processor core, a multiprocessor, an application-specific integrated circuit (ASIC), or a field programmable gate array (FPGA); however, the present disclosure is not limited thereto.

The first processor 110 according to an embodiment of the present disclosure may generate a first wake-up signal for waking up at least one slave module in the form of a pulse, and may output the first wake-up signal through the master terminal 120 described below. In this case, the width and/or period of the pulse may be variously set according to system requirements.

The master terminal 120 according to an embodiment of the present disclosure may be a terminal for connecting the master module 100 and the first slave module 200A connected to the master module 100 from among the at least one slave module.

As illustrated in FIG. 1, the master terminal 120 may include a terminal PWMO for transmitting the first wake-up signal, a terminal Rx0 for receiving data, a terminal Tx0 for transmitting data, and power terminals Vcc0 and GND0.

The master terminal 120 according to an embodiment of the present disclosure may be connected through a shielded cable 300A to the first slave module 200A described below. In this case, the shielded cable 300A may include at least one shielding layer for protecting a signal to be transmitted against noise or the like caused by an external environment.

As such, according to an embodiment of the present disclosure, because the shielded cable 300A including at least one shielding layer is used in the inter-module connection, the isolated communication between the modules may be performed with higher reliability.

The slave module number setter 130 according to an embodiment of the present disclosure may include a unit for setting the number of slave modules included in the battery module system.

The number of slave modules included in the battery module system according to an embodiment of the present disclosure may be variable. For example, a system requiring high capacity and/or high power may include a relatively large number of slave modules. On the other hand, a system requiring low capacity and/or low power may include a relatively small number of slave modules. In each case, the user may operate the slave module number setter 130 to allow the first processor 110 to recognize the number of slave modules included in the system.

For example, the slave module number setter 130 may include a switch for setting the number of slave modules connected to the master module 100 by at least one bit. For example, the slave module number setter 130 may include a switch for suitably setting each of five bits.

However, such methods and/or the number of bits are merely examples, and the slave module number setter 130 of an embodiment of the present disclosure may include any unit that may receive a user input to allow the first processor 110 to recognize the number of slave modules included in the system.

The master module 100 may further include a memory for temporarily and/or permanently storing data processed by the first processor 110, a power supply unit for supplying power to the first processor 110, and a communicator for exchanging data with the external device.

The first slave module 200A according to an embodiment of the present disclosure may be a module for managing at least one cell connected to the first slave module 200A, in cooperation with the master module 100 described above. For example, the first slave module 200A may measure the physical quantity of at least one battery cell connected to the first slave module, analyze (or process) the measurement result, and/or transmit the measurement result to the master module 100. Also, the first slave module 200A may be woken up according to the first wake-up signal transmitted by the master module 100 and may set its own identification number according to the identification number allocated by the master module 100.

Meanwhile, as described above, the first slave module 200A may be a slave module connected to the master module 100 from among the at least one slave module.

The first slave module 200A according to an embodiment of the present disclosure may include an analog front end (AFE) 210A, a second processor 220A, a first slave terminal 230A, a second slave terminal 240A, a first communication isolator 250A, and a second communication isolator 260A.

The AFE 210A according to an embodiment of the present disclosure may include a unit that may be woken up by receiving the first wake-up signal transmitted by the master module 100 and may measure at least one physical quantity of the first slave module 200A and transmit the measurement result to the second processor 220A.

For example, the AFE 210A may be woken up from a standby state by receiving the first wake-up signal generated by the master module 100 in the form of a pulse and may wake up the second processor 220A accordingly.

Also, the AFE 210A may measure physical quantities (e.g., physical properties of a material that can be quantified by measurement) such as the voltage, current, temperature, state of charge (SOC), and a balancing amount of the battery cell connected to the first slave module 200A and may transmit the measurement results to the second processor 220A.

In this case, the AFE 210A and the second processor 220A may exchange data according to a Serial Peripheral Interconnect (SPI) communication method or an Inter-Integrated Circuit (I2C) communication method. However, such communication methods are merely examples, and embodiments of the present disclosure are not limited thereto.

The second processor 220A according to an embodiment of the present disclosure may include a unit for receiving and processing a signal transmitted by the first processor 110 of the master module 100, for transmitting a signal to the first processor 110, and for processing the physical quantity measured by the AFE 210A. For example, the second processor 220A may transmit the measured physical quantity to the master module 100 in response to a physical quantity request signal of the first processor 110 or at a preset time period.

In this case, like the first processor 110, the second processor 220A may include any type of device capable of processing data. For example, the second processor 220A may include a data processing device that is embedded in hardware and has a physically structured circuit to perform a function represented by the command or code in a program.

As an example, the data processing device embedded in hardware may include any processing device such as a microprocessor, a central processing unit (CPU), a processor core, a multiprocessor, an application-specific integrated circuit (ASIC), or a field programmable gate array (FPGA); however, embodiments of the present disclosure are not limited thereto.

After being woken up based on the first wake-up signal received from the master module 100, the second processor 220A according to an embodiment of the present disclosure may generate a second wake-up signal for waking up a subsequent slave module relative to the first slave module 200A and may output the second wake-up signal through the second slave terminal 240A.

In some related arts, the AFE and the second processor may be implemented as an integrated processor, and the remaining portion of the first slave module may be designed in accordance with the integrated processor. In other related arts, the AFE and the second processor may be separately implemented, but a communication port and/or a communication method according to their own standards may be used to make a design according to the AFE and the second processor of a particular model.

The first slave module 200A according to an embodiment of the present disclosure illustrated in FIG. 1 may not be dependent on the AFE 210A and the second processor 220A of a particular manufacturer by using the general-purpose communication method and the communication port of the second processor 220A and the AFE 210A that are generally used.

A first slave terminal 230A according to an embodiment of the present disclosure may be a terminal for connecting the first slave module 200A and the master module 100. As illustrated in FIG. 1, the first slave terminal 230A may include a terminal PWM0 for receiving the first wake-up signal, a terminal Rx for receiving data, a terminal Tx for transmitting data, and power terminals Vcc0 and GND0.

Similarly, the second slave terminal 240A may be a terminal for connecting the first slave module 200A and an adjacent subsequent slave module (e.g., a second slave module). As illustrated in FIG. 1, the second slave terminal 240A may include a terminal PWM1 for transmitting the second wake-up signal, a terminal Rx1 for receiving data, a terminal Tx1 for transmitting data, and power terminals Vcc1 and GND1.

The first communication isolator 250A according to an embodiment of the present disclosure may include a unit that may be arranged on a first communication line to isolate the communication between the first slave terminal 230A and the AFE 210A. In this case, the first communication line may be a communication line connecting the first slave terminal 230A to the AFE 210A and may be a line for transmitting the first wake-up signal (e.g., pulse signal) generated by the first processor 110 to the AFE 210A.

For example, the first communication isolator 250A according to an embodiment of the present disclosure illustrated in FIG. 1 may include at least one capacitor arranged on the first communication line, as an isolation unit. However, the isolation unit is merely an example, and embodiments of the present disclosure are not limited thereto.

As such, embodiments of the present disclosure may implement a more accurate wake-up operation by providing an isolation unit on a communication line for transmitting a wake-up signal.

A second communication isolator 260A according to an embodiment of the present disclosure may include a unit that may be arranged on a second communication line to isolate (e.g., in one embodiment, isolated communication refers to isolating functional sections of electrical systems to prevent direct current flow) the communication between the first slave terminal 230A and the second processor 220A.

In this case, the second communication line may be a communication line connecting the first slave terminal 230A to the second processor 220A and may be a line for transmitting a signal generated by the first processor 110 to the second processor 220A or transmitting a signal generated by at least one of a subsequent slave module and the second processor 220A to the first processor 110.

In other words, the second communication line may include a (2-1)th communication line for transmitting a signal generated by the first processor 110 to the second processor 220A and a (2-2)th communication line for transmitting a signal generated by at least one of a subsequent slave module and the second processor 220A to the first processor 110.

The second communication isolator 260A according to an embodiment of the present disclosure may include a high-frequency transformer arranged on each of the (2-1)th communication line and the (2-2)th communication line, as the isolation unit. However, the isolation unit is merely an example, and embodiments of the present disclosure are not limited thereto.

Figure 2:
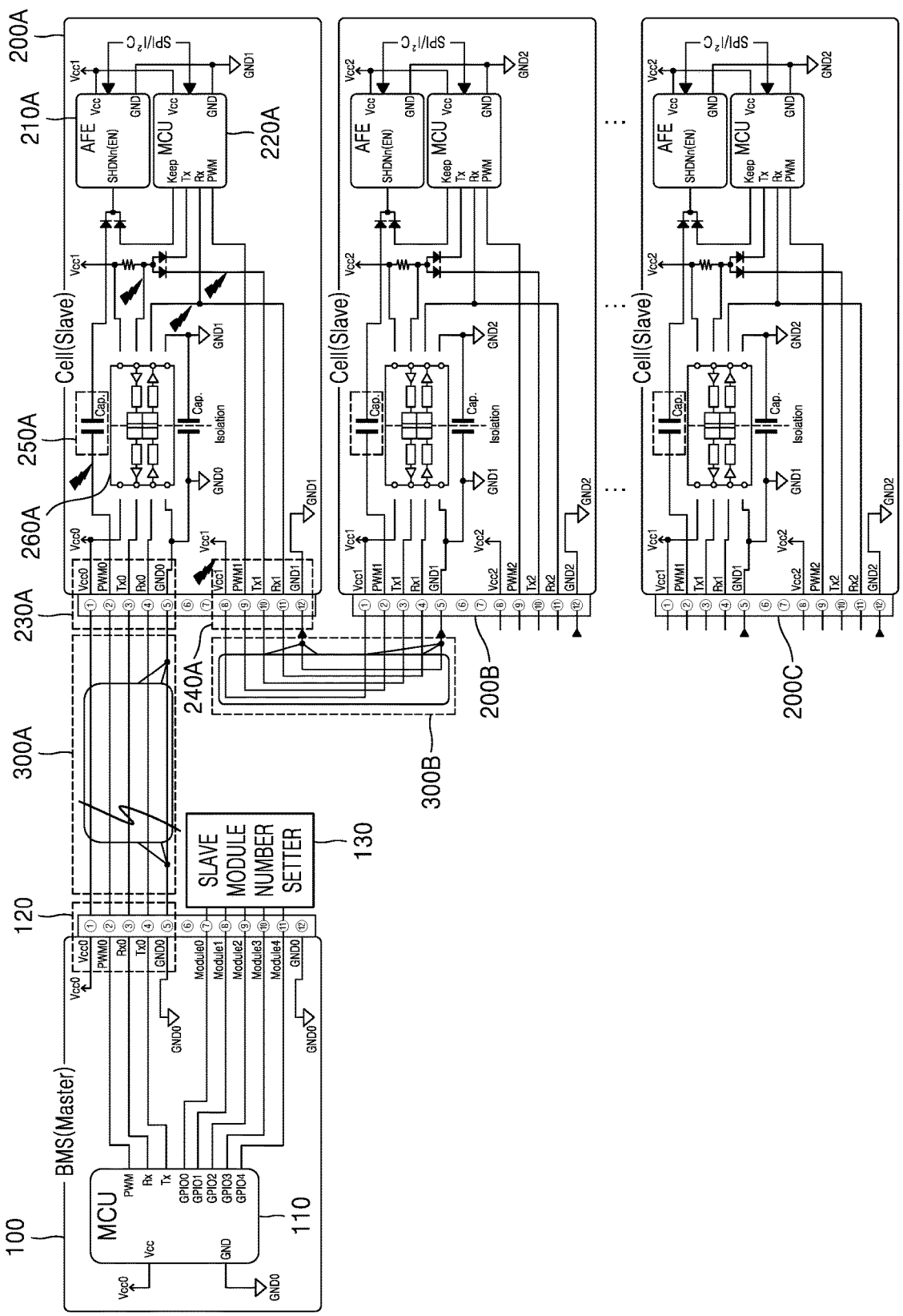
FIG. 2 is a diagram illustrating a battery module system including a plurality of slave modules.

FIG. 2 is a diagram illustrating a battery module system including a plurality of slave modules.

As illustrated in FIG. 2, a battery module system according to an embodiment of the present disclosure may include a master module 100 and a plurality of slave modules (e.g., first, second, and third slave modules 200A, 200B, and 200C). In this case, the master module 100 and the first, second, and third slave modules, 200A, 200B, and 200C may be connected in series as illustrated in FIG. 2.

Because the master module 100 and the first slave module 200A have been described above in more detail with reference to FIG. 1, redundant descriptions thereof may be omitted for conciseness.

Also, because the second and third slave modules 200B and 200C have substantially the same configuration as the first slave module 200A except for the inter-module connection relationship, redundant descriptions of the configuration of the second and third slave modules 200B and 200C may be omitted for conciseness.

Meanwhile, as in the connection between the master module 100 and the first slave module 200A, a shielded cable 300B may be used for the connection between the first slave module 200A and the second slave module 200B.

In this case, as described above, the shielded cable 300B may include at least one shielding layer for protecting a signal to be transmitted against noise or the like caused by an external environment. Similarly, a shielded cable may be used for connection between the serially-connected slave modules.

As such, according to an embodiment of the present disclosure, because the shielded cable 300A or 300B including at least one shielding layer is used in the inter-module connection, the isolated communication between the modules may be performed with higher reliability.

According to an embodiment of the present disclosure, because various suitable isolation units are provided in each module, inter-module communication may be performed with higher reliability.

Also, because an isolation unit is provided in the slave module itself, a general-purpose processor and an AFE may be used to manufacture the slave module.

Particular implementations described herein are merely embodiments, and do not limit the scope of the present disclosure in any way. For the sake of conciseness, descriptions of electronic configurations of the related art, control systems, software, and other functional aspects of the systems may be omitted. Also, the connection lines or connection members between various components illustrated in the drawings represent examples of functional connections and/or physical or logical connections between the various components, and various suitable alternative or additional functional connections, physical connections, or logical connections may be present in practical apparatuses. Also, no element may be essential to the practice of the present disclosure unless the element is specifically described as "essential" or "critical".

Thus, the spirit of the present disclosure is not limited to the above embodiments, and the scope of the present disclosure may include both the following claims and the equivalents thereof.

While one or more embodiments have been described with reference to the figures, it will be understood by those of ordinary skill in the art that various changes in form and details may be made therein without departing from the spirit and scope as defined by the following claims, and equivalents thereof.

What is claimed is:

1. A battery module system comprising:
    a plurality of slave modules comprising a first slave module and a second slave module adjacent to the first slave module;
    a master module connected in series with the plurality of slave modules, the master module comprising:
        a first processor configured to generate a first wake-up signal for waking up the plurality of slave modules and to allocate and manage an identification number of the plurality of slave modules; and
        a master terminal connecting the master module and the first slave module connected to the master module,
    wherein the first slave module comprises:
        an analog front end (AFE) configured to be woken up by receiving the first wake-up signal, to measure at least one physical quantity of the first slave module, and to transmit the measured at least one physical quantity to a second processor;
        the second processor configured to receive and process a signal transmitted by the first processor, to transmit a signal to the first processor, and to process a physical quantity measured by the AFE;
        a first slave terminal connecting the master module to the first slave module;
        a second slave terminal connecting the second slave module to the first slave module;
        a first communication isolator arranged on a first communication line connecting the first slave terminal to the AFE, the first communication isolator being configured to transmit the first wake-up signal generated by the first processor to the AFE; and
        a second communication isolator arranged on a second communication line connecting the first slave terminal to the second processor, the second communication isolator being configured to transmit a signal generated by the first processor to the second processor or to transmit a signal generated by at least one selected from the second slave module and the second processor to the first processor, and wherein an isolated communication is performed between the master module and the first slave module.

2. The battery module system of claim 1, wherein the first communication isolator comprises at least one capacitor arranged on the first communication line.

3. The battery module system of claim 1, wherein the first communication line is configured to transmit a pulse width modulation signal generated by the first processor and received through the first slave terminal to the AFE.

4. The battery module system of claim 1, wherein the second communication line comprises:
    a (2-1)th communication line configured to transmit the signal generated by the first processor to the second processor; and
    a (2-2)th communication line configured to transmit the signal generated by at least one selected from the second slave module and the second processor to the first processor.

5. The battery module system of claim 4, wherein the second communication isolator comprises a high-frequency transformer arranged on the (2-1)th communication line and the (2-2)th communication line.

6. The battery module system of claim 1, wherein the master terminal and the first slave terminal are electrically connected by a shielded cable comprising at least one shielding layer.

7. The battery module system of claim 1, wherein the second processor is configured to generate, after receiving the first wake-up signal, a second wake-up signal for waking up the second slave module and to transmit the generated second wake-up signal to the second slave module through the second slave terminal.

8. The battery module system of claim 7, wherein the first slave module and the second slave module are electrically connected by a shielded cable comprising at least one shielding layer.

9. The battery module system of claim 1, wherein the master module further comprises a slave module number setter configured to set the number of the plurality of slave modules.

10. The battery module system of claim 9, wherein the slave module number setter comprises a switch configured to set the number of the plurality of slave modules connected to the master module by at least one bit.

* * * * *